Inventors,
Ralph R. Brouwer
& Charles E. Faulkner
By: Schneider & Dressler,
Attys.

Nov. 6, 1956 C. E. FAULKNER ET AL 2,769,518

RECORD DISC FOR STORING INFORMATION
AND SYSTEM USING SUCH RECORD

Filed June 22, 1954 2 Sheets-Sheet 2

Inventors
Ralph R. Brouwer
& Charles E. Faulkner,
By: Schneider & Dressler,
Attys.

United States Patent Office 2,769,518

Patented Nov. 6, 1956

2,769,518

RECORD DISC FOR STORING INFORMATION AND SYSTEM USING SUCH RECORD

Charles E. Faulkner and Ralph R. Brouwer, Chicago, Ill., assignors to Spiegel, Inc., a corporation of Delaware Application June 22, 1954, Serial No. 438,439

6 Claims. (Cl. 197—20)

This invention relates to a record disc for storing information and to a system using such record, and is particularly adapted for use in connection with teletypewriters.

Teletypewriters for making a tape record and for operating from a tape record are well known in connection with record-controlled typewriters, telegraph communication systems, multiple typewriter systems and the like. As is well known, such typewriters have conventional keys for actuation by an operator in which case a tape record is created. This tape record consists of a series of regularly spaced index apertures, each such index aperture corresponding to one type space. The record also includes additional apertures disposed laterally of the tape, the number and pattern of such apertures corresponding to a desired character to be typed. Such a tape when fed through suitable mechanism can be used to control the operation of one or more properly equipped typewriters to type out letters and words corresponding to the record.

Typewriters properly equipped for such record-controlled operation and tape records for the same may be used for providing such individual parts of a letter as the name, address, etc., and are used where large quantities of mail or typewritten matter are to be sent. Frequently form letters are handled by tape-controlled typewriter.

It has been found that a serious deterrent to the use of such record-controlled typewriters is occasioned by the inconvenience of handling the tape records. Long lengths of tape may be required for storing the desired record material and such long lengths render access to desired parts of the record difficult.

This invention provides an improvement whereby the record for such automatic machines as typewriters and the like is retained in a different form than tape. In accordance with this invention I have provided a disc record having an annular record track for storing a limited amount of information. The record track of such a disc record is long enough to store sufficient information so that, for many purposes, one disc record forms a complete record for one individual or relating to one subject.

Furthermore, the invention provides suitable means for operating the record in synchronism with a typewriter, whereby effective cooperation between the record and typewriter is made possible.

The record forming the subject matter of this invention is desirable for the reason that it may be stored easily and is sufficiently individual so that all records are equally accessible.

In general, the new record comprises a disc of any suitable material such as paper of suitable strength, plastic, metal or the like. The record track comprises the peripheral portion of the record. The record itself may be in the same form as on tape and may consist of regularly spaced index apertures flanked by communication apertures in a desired pattern. The maximum amount of recorded material will be determined by the circumferential length of the record track.

In typewriters of the character referred to where conventional tape is used, it is customary to provide both a record making or punching station and record reproducing or reading station. As a rule, such machines have two such stations in alignment so that a tape record made at the recording station will pass through the reproducing station in the event that the tape record is to be used immediately after being made. As will be more fully apparent later in connection with the description, it is possible to maintain this dual station characteristic while utilizing the present invention. Thus, in an apparatus embodying the present invention, means are provided whereby a disc record may be made in connection with one operating station while a separate disc record may be reproduced simultaneously in connection with a different station.

For an explanation of the invention, reference will now be made to the drawings wherein an exemplary embodiment illustrating the invention is disclosed, it being understood, however, that variations may be made within the scope of the invention as defined by the appended claims.

In the drawings, Figure 1 is an isometric view illustrating a typewriter equipped with a punching and reading station construction and attachments embodying the present invention;

Figures 1, 4:
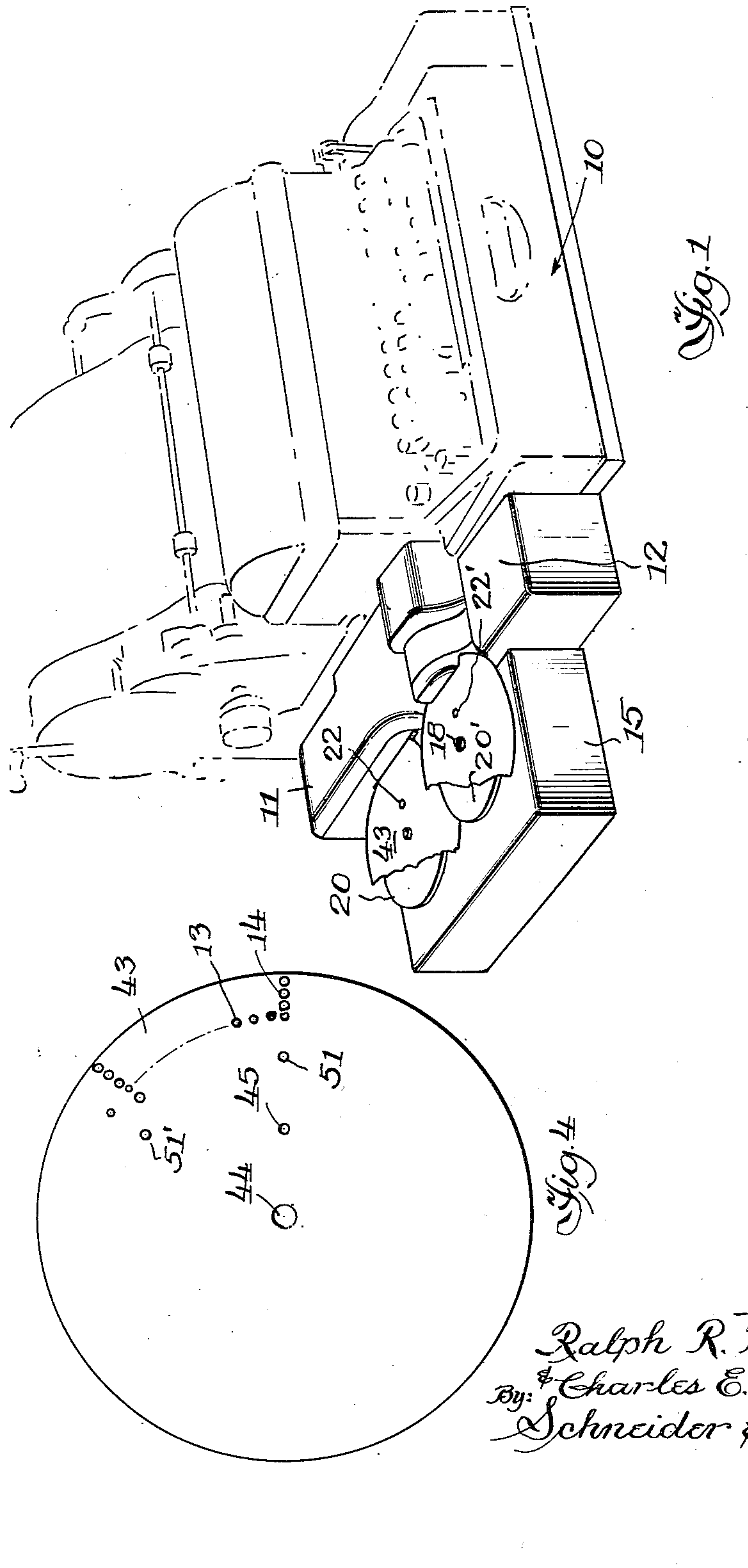
Figure 4 is a plan view of the new record disc.

Referring first to Figure 1, a motor operated typewriter, generally indicated by 10, is shown in outline, this typewriter being of the type normally equipped for punching and/or being operated by a perforated tape. Forming part of the typewriter construction is punching station 11 and reading station 12. These two stations are provided with suitable mechanism including shafts for driving parts of the station mechanism with each actuation of the typewriter. Thus, as is well known, punching station 11 is ordinarily equipped with punches for operating on flexible tape of paper or the like. As a rule, the tape is provided with a monitoring track wherein a line of regularly spaced apertures 13 is punched along a circular arc, one aperture corresponding to each typewriter actuation. Laterally of each monitoring aperture is spaced for additional separate coding apertures 14. These coding apertures are punched in said space in radial alignment with said monitoring apertures.

At reading station 12, fingers are provided for cooperating with the coding apertures and monitoring aperture so that reading station 12 will function to cause typewriter 10 or other typewriters to be operated in accordance with the tape passing through reading station 12. Inasmuch as the mechanism for both the punching and reading stations, as well as the typewriter, are well known and widely used, a description thereof is not deemed to be necessary except as will be required for a proper understanding and disclosure of the invention.

Figure 5:
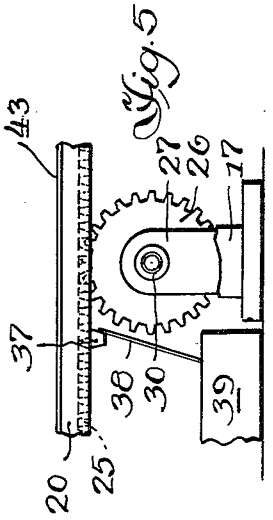
Figure 5 is a detail illustrating the automatic stop switch when the end of the record track has been reached.
Figure 2:
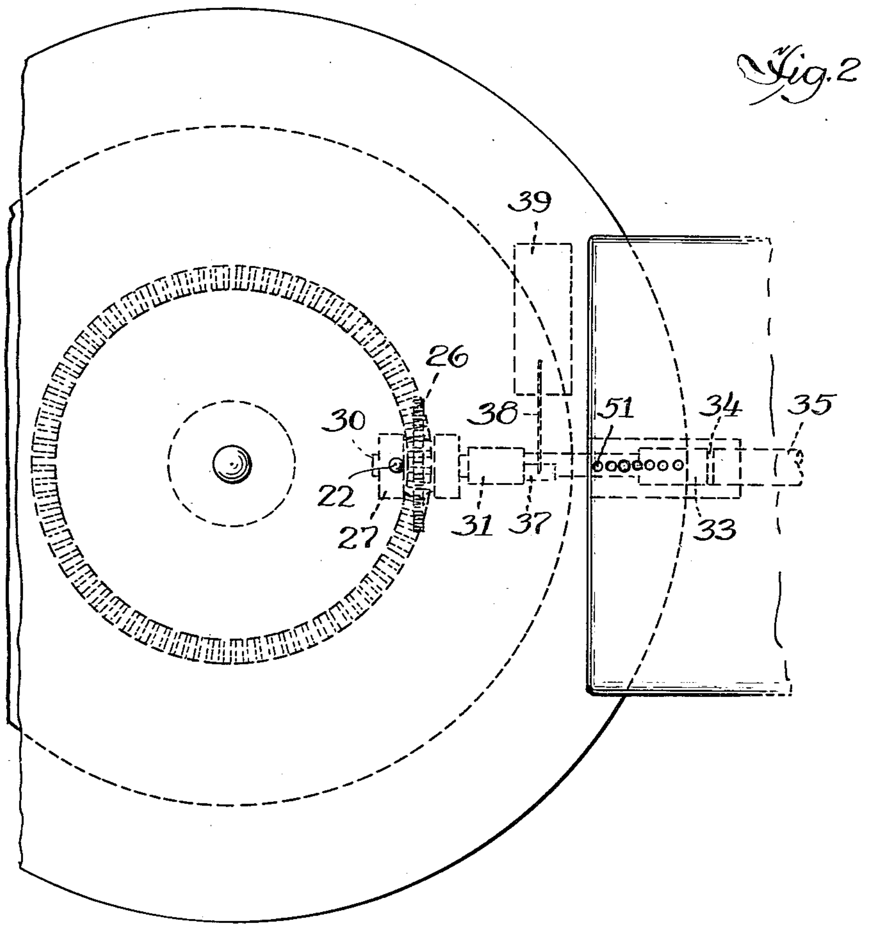
Figure 2 is a plan view of the record and attachment embodying the present invention.
Figure 3:
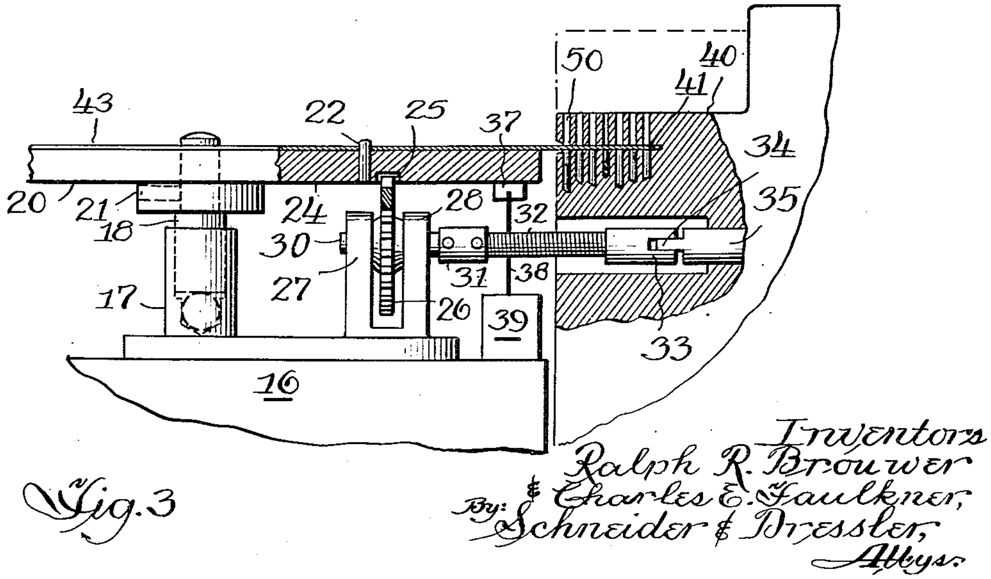
Figure 3 is a sectional detail showing certain parts of a typewriter station together with a turntable and disc embodying the present invention.

In accordance with this invention, there is disposed adjacent stations 11 and 12 an attachment generally indicated by 15. Attachment 15 includes base 16 carrying a pair of end thrust bearings, one of which is illustrated in Figure 3 and indicated by 17. The mechanism for both the punching and reading stations is identical as far as this invention is concerned. The details illustrated in Figures 2, 3 and 5, for example, may be considered as illustrating either of the two stations, it being understood that the other station is provided with similar mechanism. Thrust bearing 17 rotatively supports spindle 18 upon which is secured turntable 20. Turntable 20 is secured to spindle 18 as by set screw 21, the spindle being adapted to turn freely in thrust bearing 17 and being readily removed therefrom. Turntable 20 has index pin 22 set in the same and extending upwardly from the top surface, the index pin being located at a predetermined distance from the center of the turntable. As illustrated in Figure 1, turntable 20 may, for example, be the turntable associated with punching station 11 while turntable 20′ may be associated with reading station 12.

Turntable 20 carries at bottom face 24 thereof annular rack 25. Cooperating with annular rack 25 is pinion 26 suitable secured in journals 27 and 28 and carried on base 16. Pinion 26 is mounted so that the pinion itself lies in a generally vertical plane as illustrated in the drawings. Pinion 26 is rigidly secured to shaft 30 carrying coupling 31 at one end thereof. Coupling 31 has clamped thereto flexible shaft 32 terminating in grooved coupling fixture 33. Grooved coupling fixture 33 is adapted to cooperate with tongue coupling driving member 34 on shaft 35 extending into the typewriter. Shaft 35 forms part of the conventional mechanism in both the punching and reading stations in typewriter 10.

In the punching station, shaft 35 is driven by the typewriter, the shaft being turned through a predetermined angle for each actuation of the typewriter. In the case of reading mechanism 12, shaft 35 cooperates with suitable control mechanism so that for a predetermined angular movement of shaft 35 there is one typewriter actuation. The nature of the operation would, of course, be determined by the record at the reading station.

Radially aligned with index pin 22 is dog 37 carried by turntable 20 at the bottom surface thereof. Dog 37 extends downwardly from the turntable and cooperates with finger or switch arm 38 of a switch, generally indicated by 39, for controlling the motor operating typewriter 10. In the position of the dog and switch arm illustrated in Figure 5, the switch will be moved to the off position to disable the motor for the typewriter for the purpose of indicating that the end of the record track has been reached. It is not necessary that dog 37 be radially aligned with index pin 22.

Turntable 20 is disposed so that the outer edge thereof clears the station head generally indicated by 40. Head 40 for punching or reading has horizontal slot 41 having a suitable depth and width for accommodating a record. Head 40 also contains a number of rods or pins associated with suitable mechanism for either punching apertures in the tape or record or for reading a punched record. The punching and reading pin mechanism is well known and widely used in these typewriters. Carried by turntable 20 is record disc 43 having a spindle aperture 44 and index pin aperture 45. Record disc 43 has a radius greater than turntable 20, the overhanging part being sufficient to enter slot 41 in the station head. The record is of suitable material such as stiff paper, parchment, plastic, etc., or may even be of thin metal such as aluminum, if desired. The record material should be susceptible to punching by the punch pins in the punching station. In general, paper or plastic may be readily used.

A peripheral annular portion of the record disc overhanging the turntable will constitute a wide record track whose linear extent will be determined by the radius of the disc. In order to permit turntables 20 and 20′ on the punching and reading stations, respectively, to clear each other, it is desirable to dispose the two turntables at different levels with the centers of the two turntables being spaced sufficiently so that the record disc on turntable 20 will clear the mechanism of the turntable for 20′. This, of course, will necessitate the heads on the punching and reading stations to be at different levels.

Thus, in the commercial typewriters equipped with punching and reading stations, the clearance between the two stations is normally large enough so that with the arrangement of different levels, it is possible to use a record disc having a radius of about 3.5″. Except for the difference in level of the two stations, the punching and reading stations may be identical in construction to what is presently used for tape. By using a record disc having a radius of about 3.5″, it will be found that the conventional advance of pinion 26 due to typewriter shaft 35 will provide sufficient clearance between successive record apertures along the circumference of a circle so that the successive apertures will clear each other and provide for some intervening record material.

It is possible to provide automatic means for initiating and stopping the operation of the record mechanism. Thus, as has been pointed out before, conventional tyewriters associated with tape records utilize a series of small control apertures for each typewriter actuation, together with a code providing for larger apertures on both sides of each control aperture. It is possible, however, to provide an extra punch or reading pin 50 for either punching or reading extra apertures 51 and 51′ in the record. Such extra apertures may be made to cooperate with a suitable switch on the reading station controlled by punch 50 so that when a record disc is first started, aperture 51 will cause the typewriter motor to start automatically and begin the reading operation. Punch 50 and the corresponding reading pin will be one of the complement of pins in the station head. When aperture 51′ is encountered anywhere along the track up to a maximum of about 357° or the like, depending upon the angular extent subtended by a pair of successive apertures, then the typewriter motor will be shut off. Dog 37 carried by the turntable will function to prevent overrunning of the disc when a full turn has been made.

Stopping aperture 51′ may be punched in the record disc at any place along the record to stop the machine. It is understood, of course, that during the making of the disc record, the operator will cause the corresponding punch in the punching station to cut aperture 51 at the beginning of the record and will cause the stopping aperture 51′ to be punched at a desired point.

When a disc record is first positioned, the turntable is raised to clear the drive pinion and the turntable is oriented to the proper starting position.

Suitable marking or an identification slip carrying suitable marking may be disposed on the record disc so that a disc may be identified quickly.

Thus it will be seen that a convenient record disc for use in connection with automatically controlled typewriters, together with simple means for use in cooperation with the punching and/or reading stations of an automatically controlled, motor operated typewriter, has been provided in accordance with the invention described and claimed herein.

What is claimed is:

1. For use with a typewriter or similar machine having punching and reading stations with heads for normal cooperation with perforated tape, an attachment comprising two turntables in horizontal planes but at different levels, said punching and reading station heads also being at different levels and having slots at different levels for accommodating the record, said attachment being disposed so that the two turntables are substantially level with the slots in the two typewriter stations, and means coupling said turntables and said typewriter station mechanism for turning said two turntables through a predetermined angle for each typewriter actuation, each turntable being adapted to accommodate a disc record of perforatable material with the disc record extending beyond the edge of the turntable for entry into the slot of the station head mechanism.

2. For use with a typewriter or similar machine having at least one operating station having a head for normal cooperation with a perforated tape, an attachment comprising at least one turntable, means for mounting said turntable so that the same is substantially level with the tape slot in the typewriter station head, shaft means coupled to said typewriter station mechanism for turning the shaft through a predetermined angle for each typewriter actuation, a pinion driven by said shaft, an annular rack carried by said turntable for cooperation with said pinion whereby said turntable is turned through a predetermined angle for each typewriter actuation, said turntable being adapted to accommodate a disc record of perfortable material with the disc record extending beyond the edge of the turntable for entry into the slot of the station head mechanism.

3. The construction according to claim 2 wherein said turntable has a stop dog at the bottom thereof and wherein stop switch means are carried by said attachment for cooperation with said dog wheerby said turntable can be driven through almost a complete turn before the stop switch is actuated for stopping the typewriter mechanism.

4. In combination a disc record comprising a flat disc of thin, readily perforatable material, said disc having a central aperture and one offset aperture for locating said disc in properly oriented position, a turntable having a spindle and offset pin for accommodating said disc, said disc having a larger radius than said turntable with the overhanging part of the disc forming an annular record track wide enough to accommodate coding perforations used in teletypewriters, means for supporting said turntable, a teletypewriter having at least one operating station with a station head having a slot therein normally for cooperation with record tape, and means connecting said turntable and the typewriter station head for driving the turntable through a predetermined angle for each actuation of the typewriter, said disc being adapted to enter the slotted head at the typewriter station for cooperation therewith.

5. In combination, two equally sized disc records each comprising a flat disc of thin, readily perforated material, each disc having a central aperture and one offset aperture for locating the disc in properly oriented position, a pair of turntables each having a spindle and offset pin for actuating a disc, each disc having a larger radius than said turntable with the overhanging part of a disc forming an annular record track wide enough to accommodate coding perforations used in teletypewriters, a teletypewriter having punching and reading stations with station heads having slots therein normally for cooperation with record tape, the reading and punching stations being on different levels, means for supporting said turntables so that discs on said turntables together with said turntables are on different levels corresponding to the different levels of the station slots, one disc being adapted to enter the slot of a punching station and the other disc being adapted to enter the slot of a reading station, said turntables being clear of each other, and means connecting each turntable and the corresponding typewriter head for driving the turntable through a predetermined angle for each actuation of the typewriter.

6. For use with a typewriter or similar machine having two operating stations at two different levels, said stations having heads for normal cooperation with a perforated tape, an attachment comprising two turntables for said heads, means for mounting said turntables at the two levels so that each turntable is substantially level with the tape slot in the corresponding typewriter station head, shaft means for each turntable, said shaft means being coupled to a typewriter station mechanism for turning the shaft through a predetermined angle for each typewriter actuation, a pinion for each shaft driven thereby, an annular rack carried by each turntable for cooperation with each pinion whereby said turntables are turned through a predetermined angle for each typewriter actuation, each turntable being adapted to accommodate a disc record of perforatable material with the disc record extending beyond the edge of its turntable for entry into the slot of the station head mechanism, the spacing and arrangement of levels for the station heads being such that the two turntables and discs will clear each other while still cooperating with their respective station heads.

References Cited in the file of this patent

UNITED STATES PATENTS

| | | |
|---|---|---|
| 749,836 | Rod | Jan. 19, 1904 |
| 1,975,791 | Hopkins | Oct. 9, 1934 |
| 2,318,325 | Nichol et al. | May 4, 1943 |
| 2,390,413 | Ayres | Dec. 4, 1945 |
| 2,461,451 | Tholstrup | Feb. 8, 1949 |
| 2,557,061 | Goldman | June 19, 1951 |

FOREIGN PATENTS

| | | |
|---|---|---|
| 9,688 | Great Britain | July 29, 1899 |
| 384,653 | Great Britain | Nov. 28, 1932 |